(12) United States Patent
Shim et al.

(10) Patent No.: US 7,376,101 B2
(45) Date of Patent: May 20, 2008

(54) SECURE CANDIDATE ACCESS ROUTER DISCOVERY METHOD AND SYSTEM

(75) Inventors: Eunsoo Shim, West Windsor, NJ (US); Jens-Peter Redlich, Plainsboro, NJ (US); Richard D. Gitlin, Little Silver, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 350 days.

(21) Appl. No.: 10/722,809

(22) Filed: Nov. 26, 2003

(65) Prior Publication Data
US 2004/0166857 A1 Aug. 26, 2004

Related U.S. Application Data

(60) Provisional application No. 60/449,169, filed on Feb. 20, 2003.

(51) Int. Cl.
*H04Q 7/00* (2006.01)
(52) U.S. Cl. .................. 370/331; 455/436; 455/437; 455/438
(58) Field of Classification Search .............. 455/436; 370/331, 247
See application file for complete search history.

(56) References Cited

U.S. PATENT DOCUMENTS

| | | | | |
|---|---|---|---|---|
| 6,119,005 A | * | 9/2000 | Smolik | 455/436 |
| 6,370,380 B1 | * | 4/2002 | Norefors et al. | 455/436 |
| 6,487,406 B1 | * | 11/2002 | Chang et al. | 455/422.1 |
| 6,600,917 B1 | * | 7/2003 | Maupin | 455/414.1 |
| 6,813,357 B1 | * | 11/2004 | Matsuzaki et al. | 380/279 |
| 7,065,340 B1 | * | 6/2006 | Einola et al. | 455/410 |
| 2002/0085514 A1 | * | 7/2002 | Illidge et al. | 370/329 |
| 2002/0176445 A1 | * | 11/2002 | Melpignano | 370/480 |
| 2002/0197979 A1 | * | 12/2002 | Vanderveen | 455/410 |
| 2004/0066764 A1 | * | 4/2004 | Koodli et al. | 370/331 |
| 2004/0123142 A1 | * | 6/2004 | Dubal et al. | 713/201 |
| 2004/0166861 A1 | * | 8/2004 | Trossen | 455/436 |
| 2005/0105491 A1 | * | 5/2005 | Chaskar et al. | 370/331 |

OTHER PUBLICATIONS

"A Dynamic Protocol for Candidate Access-Router Discovery", Trossen et al, Seamoby Working Group, Internet Draft, Oct. 25, 2002, pp. 1-44, http://www.ietf.org/internet-drafts/draft-trossen-seamoby-dycard-00.txt.*
C. Perkins, ed. "IP Mobility Support", Internet Engineering Task Force (IETF), Reuqest for Comments 2002, Oct. 1996.
G. Mommety, et al., "Fast Handoffs for Mobile IPvG", IETF, Internet Draft, draft-ietf-mobileip-fast-mipv6-04.txt, work in progress, Mar. 2002.

(Continued)

*Primary Examiner*—Rafael Perez-Gutierrez
*Assistant Examiner*—Mazda Sabouri
(74) *Attorney, Agent, or Firm*—Joseph J. Kolodka

(57) ABSTRACT

Security mechanisms are disclosed that protect the integrity of the candidate access node discovery procedures in a mobile communication network. In accordance with an aspect of the invention, an access node stores information on candidate access nodes in the mobile communication network and updates the information only after verifying information provided by a mobile terminal after a handoff from one access node to another access node. In accordance with another aspect of the invention, the information on candidate access nodes in the mobile communication network are associated with a particular mobile terminal and stored at the mobile terminal in a candidate access node list.

19 Claims, 11 Drawing Sheets

OTHER PUBLICATIONS

E. Shim et al., "Fast Handoff Using Neighbor Information", IETF, Mobile IP Working Group, Internet Draft, Nov. 2002.

D. Trossen et al., "Protocol for Candidate Access Router Discovery for Seamless IP-level Handovers", IETF SeaMoby Working Group, Internet Draft, Nov. 2001.

D. Funato et al., "Geographically Adjacent Access Router Discovery Protocol", IETF, SeaMoby Working Group, Internet Draft, Nov. 2001.

W. Diffie et al., "New Directions in Cryptography", IEEE Transactions on Information Theory IT-22, Nov. 1976.

* cited by examiner

| Message ID | Sending MH's IP Address | Receiving AR' IP Address | Filter |

FIG 6A

| Message ID | Sending AR's IP Address | Receiving MH' IP Address | CAR Info |

FIG 6B

| Message ID | Sending MH's IP Address | Receiving AR' IP Address | BS's MAC Address | Air Link Type | Link Specific Options |

FIG 6C

| Message ID | Sending AR's IP Address | Receiving MH's IP Address | Ticket |

FIG 6D

| Message ID | Sending MH' IP Address | Receiving AR' IP Address | Ticket | Prev AR's IP Address | Prev BS's MAC Address |
|---|---|---|---|---|---|
| Air Link Type | Link Specific Options | | | | |

FIG 6E

| Message ID | Sending AR' IP Address | Receiving MH's IP Address | Result |
|---|---|---|---|

FIG 6F

| Message ID | Sending AR's IP Address | Receiving AR's IP Address | MH's IP Address | Ticket | MH's Physical ID |
|---|---|---|---|---|---|
| MH's Stay Time | AR Certificate | | | | |

FIG 6G

| Message ID | Sending AR's IP Address | Receiving AR's IP Address | Result | AR Certificate |
|---|---|---|---|---|

FIG 6H

| Message ID | Sending MH's IP Address | Receiving AR's IP Address | MH Class ID Card | Prev AR's IP Address | Prev BS's MAC Address |
|---|---|---|---|---|---|
| Air Link Type | Link Specific Options | | | | |

FIG 8A

| Message ID | Sending AR' IP Address | Receiving MH's IP Address | Result | MH's New Class ID Card |
|---|---|---|---|---|

FIG 8B

| Message ID | Sending AR's IP Address | Receiving AR's IP Address | MH's IP Address | AR Certificate |
|---|---|---|---|---|

FIG 8C

| Message ID | Sending AR's IP Address | Receiving AR's IP Address | Result | AR Certificate |
|---|---|---|---|---|

FIG 8D

| AR IP Address | BS MAC Address | Attribute Name | Attribute Value |
|---|---|---|---|
| 128.45.111.12 | 10:23:43:1F:00:45 | Link Type | 802.11b |
| | | Channel | 2412 kHz |
| | | Refresh Time | 12123123443 |
| | | ... | .... |
| | 10:45:33:10:3A:3F | Link Type | 802.11b |
| | | Channel | 2437 kHz |
| | | Refresh Time | 14198321083 |
| | | ... | .... |
| 128.45.100.50 | 3F:12:45:45 | Link Type | GSM |
| | | Authentication | SIM |
| | | Carrier | |
| | | Refresh Time | 12124123453 |
| | | ... | .... |
| 145.33.129.1 | 12:4F:3A:34:00:45 | Link Type | Bluetooth |
| | | Refresh Time | 12434924098 |
| | | ... | .... |
| | 10:23:A0:10:34:11 | Link Type | 802.11a |
| | | Refresh Time | 12472098098 |
| | | ... | .... |

FIG 9

CAR table

SECURE CANDIDATE ACCESS ROUTER DISCOVERY METHOD AND SYSTEM

This application claims priority to U.S. Provisional Patent Application, Serial No. 60/449,169, entitled "SECURE CANDIDATE ACCESS ROUTER DISCOVERY SYSTEM", filed on Feb. 20, 2003, the contents of which are hereby incorporated by reference herein.

BACKGROUND OF THE INVENTION

The invention relates to communication networks, and, more particularly, to secure mechanisms for enabling seamless mobility in wireless communication networks.

Wireless communication networks permit a user of a mobile terminal to roam geographically typically through the notion of a "hand-off" in which a communication link is transferred from one access point/base station to another. Recently, standards have been developed for integrating mobility support into packet-switched networks, such as Internet Protocol (IP)-based networks, including the notion of an IP-level handoff between access routers (ARs) which act as points of attachment to an IP network. See C. Perkins, ed., "IP Mobility Support," Internet Engineering Task Force (IETF), Request for Comments 2002, October 1996, which is incorporated by reference herein. Unfortunately, the handoff latency and packet loss incurred can be too high for many scenarios, especially those that require a high level of quality of service (QoS). Recent developments have introduced low-latency handoff mechanisms that can reduce handoff latency significantly. See G. Mommety, A. Yegin, C. Perkins, G. Tsirtsis, K. El-Malki, M. Khalil, "Fast Handoffs for Mobile IPv6, " IETF, Internet Draft, draft-ietf-mobileip-fast-mipv6-04.txt, work in progress, March 2002, which is incorporated by reference herein. However, such low-latency handoff mechanisms typically require some a priori knowledge of the target of the handoff, the next access router, including the IP address of the router.

Protocols have been developed that permit the discovery of geographically adjacent routers and that enable the collection of information regarding such "candidate" access routers prior to a handoff situation. See E. Shim, R. D. Gitlin, "Fast Handoff Using Neighbor Information," IETF, Mobile IP Working Group, Internet Draft, draft-shim-mobileip-neighbor-00.txt, November 2000; D. Trossen, G. Krishnamurthi, H. Chaskar, E. Shim, R. D. Gitlin, "Protocol for Candidate Access Router Discovery for Seamless IP-level Handovers," IETF, SeaMoby Working Group, Internet Draft, draft-trossen-seamoby-cardiscovery-00.txt, work in progress, November 2001; and D. Funato, X. He, C. Williams, A. Takeshita, "Geographically Adjacent Access Router Discovery Protocol," IETF, SeaMoby Working Group, Internet Draft, draft-funato-seamoby-gaard-00.txt, work in progress, November 2001, the contents of which are incorporated by reference herein. Unfortunately, the inventors have recognized that existing protocols have serious security problems and can be susceptible to a number of different security threats.

Accordingly, there is a need for more secure mechanisms for enabling the dynamic collection of information about neighboring access nodes, which account for the possibility of untrusted mobile terminals and access nodes.

SUMMARY OF INVENTION

The present invention is directed to security mechanisms that protect the integrity of the candidate network access node discovery procedures in a mobile communication network. In accordance with an aspect of the invention, an access node stores information on candidate access nodes in the mobile communication network and updates the information only after verifying information provided by a mobile terminal after a handoff from one access node to another access node. In an embodiment of the invention, a first access node generates a ticket which the mobile terminal provides to a second access node after handoff; the second access node can then verify the ticket with the first access node before updating the information on candidate access nodes. The ticket can be, without limitation, an opaque value known only to the first access router and/or can include other information useful for security checks. In accordance with another embodiment of the invention, the information provided by the mobile terminal includes an identifier for the mobile terminal (such as a media access control address). The identifier can be used to check whether the mobile terminal that provided the information is the same mobile terminal that communicated with the previous access node prior to handoff, thereby minimizing the risk of a third-party delivery attack. In another embodiment of the invention, the information provided by the mobile terminal is verified by measuring delay occurring during the handoff of the mobile terminal, thereby addressing the possibility of a delayed-delivery attack. The delay can be approximated using timestamps recorded by the first and second access nodes. In accordance with another embodiment of the invention, messages between the first and second access nodes can be authenticated, thereby minimizing the risk of a possible man-in-the-middle attack. A limit can be placed on the number of messages received from a mobile terminal prior to verifying the information provided, thereby addressing a possible denial-of-service attack from a mobile terminal.

In accordance with another aspect of the invention, the information on candidate access nodes in the mobile communication network can be associated with a particular mobile terminal. A candidate access node list can be stored at the mobile terminal, preferably in a compact representation such as a bitmap whose bits correspond to entries in a candidate access node table stored in the access nodes in the mobile communication network. The candidate access node list can be provided to an access node, which updates and returns the list to the mobile terminal after a handoff. The candidate access node list can be digitally signed by an access node. The use of candidate access node lists, each associated with a mobile terminal, advantageously minimizes the security requirements of the underlying network, since false information provided by a malicious mobile terminal does not affect other mobile terminals in the network.

These and other advantages of the invention will be apparent to those of ordinary skill in the art by reference to the following detailed description and the accompanying drawings.

SUMMARY OF DRAWINGS

FIGS. 6A through 6H are illustrative message formats showing the contents of the messages exchanged in FIG. 5, in accordance with a preferred embodiment of aspects of the present invention.

FIGS. 8A through 8D are illustrative message formats showing the contents of the messages exchanged in FIG. 7, in accordance with a preferred embodiment of aspects of the present invention.

FIG. 9 is an illustrative candidate access node table, generated through the candidate access node discovery procedures.

DETAILED DESCRIPTION

Figure 1:
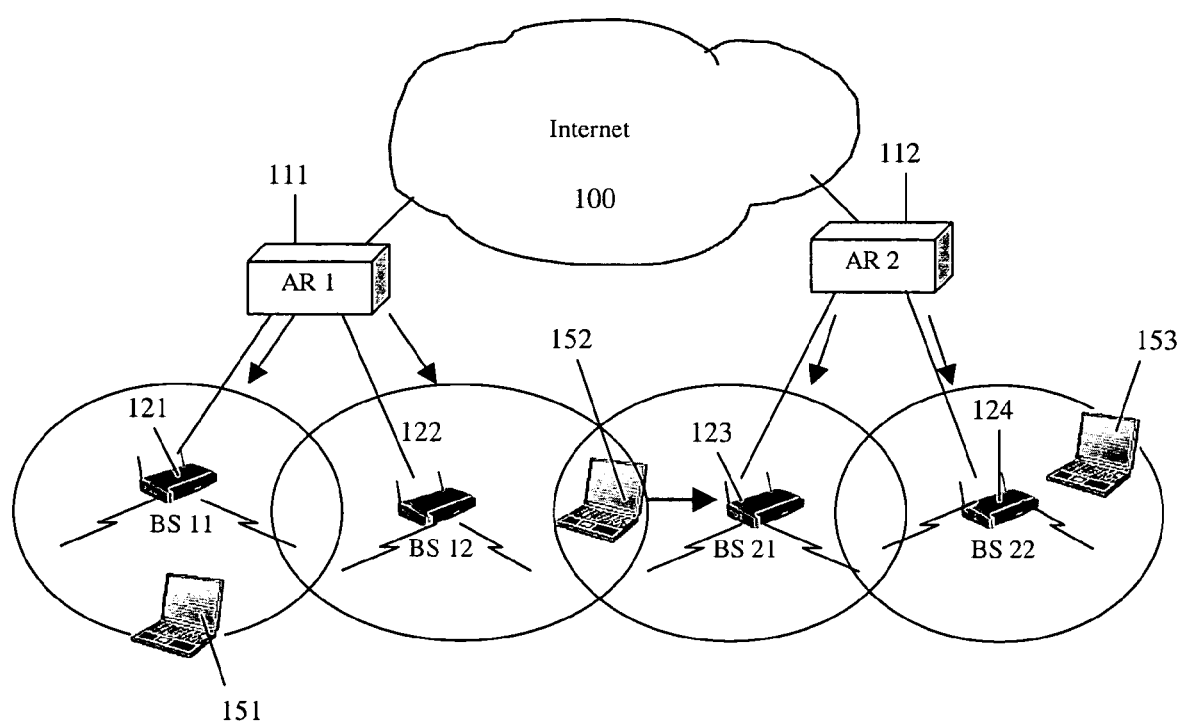
FIG. 1 is a diagram showing an illustrative mobile communication network, suitable for practice of embodiments of the present invention.

FIG. 1 is a diagram of an illustrative mobile communication network, suitable for practice of embodiments of the present invention. A plurality of mobile terminals, e.g., 151, 152, 153, are provided connectivity through a communication network 100. The communication network depicted in FIG. 1 and discussed herein is illustratively a packet-switched network such as an Internet-Protocol (IP) network; nevertheless, the present disclosure is readily extendable to other types of communication networks that are not packet-switched. At least a part of the connectivity to the communication network 100 is facilitated through a wireless link. For example, and without limitation, the mobile terminals 151, 152, 153 can have some form of air link interface that communicates with a plurality of geographically dispersed base stations 121, 122, 123, 124, as depicted in FIG. 1. The present invention is not limited to any particular wireless link technology: for example, and without limitation, the link technology could be based on 802.11a standards, 802.11b, IS-95A (CDMAOne), WCDMA-FSS, CDMA2000, etc. It should also be noted that the mobile communication network and the corresponding mobile terminals advantageously may support and encompass more than one wireless link technology.

The mobile terminals 151, 152, 153 can be any type of device that can act as a host in the communication network 100, for example and without limitation, notebook computers, personal digital assistants, cellular telephones, or any other type of device (whether mobile or fixed, although preferably mobile) with an appropriate interface for the particular wireless link technology utilized. The device should have sufficient memory and processing capabilities to participate in the herein-described discovery procedures. For purposes of illustration and discussion only, the mobile terminals are assumed to be IP-enabled devices that can be assigned IP addresses to act as hosts in the IP network. The mobile terminals and the base stations may also have additional identification information specific to the particular wireless link technology utilized, such as a media access control (MAC) address or some other layer two identifier.

Each base station 121, 122, 123 facilitates access to the communication network 100 through an access node 111, 112 in the communication network. The access nodes 111, 112 can be deployed in any of a number of ways that is not relevant to the invention. For example, a single access node can be assigned to more than one base station and provide connectivity for terminals communicating with the respective base stations, as depicted in FIG. 1. Alternatively, an access node can be assigned to a single base station or even be integrated with the base station as a single access point device. For purposes of discussion herein, it shall be assumed, without limitation, that the access nodes are IP routers, and shall be referred to herein sometimes as access routers. It is assumed that there is a mechanism for addressing handoff from one access node to another access node while maintaining connectivity to the communication network. For purposes of illustration and discussion herein only, it is assumed that the handoff mechanism is built upon the Mobile IP protocol. See C. Perkins, ed., "IP Mobility Support," IETF, RFC 2002, October 1996, which is incorporated by reference herein. Each base station, for example, could broadcast beacons over the wireless link periodically that contain information necessary for the mobile host to establish link level connectivity with the base station; the details of such a beacon would be specific to the particular link technology supported by the base station. Each access router could broadcast router advertisement messages over the wireless link periodically that contain information necessary for mobile hosts to establish IP connectivity with the access router, for example by using the foreign agent advertisement message specified in the Mobile IPv4 protocol. Where more than one base station is served by an access node, as depicted in FIG. 1, the coverage area of a particular access node can be defined to encompass the coverage areas of the particular base stations served by the particular access node. Shown in FIG. 1 is a mobile host 152 which hands over from access router 111 to access router 112. For purposes of terminology below, an access node such as router 111 from which the handoff is initiated is referred to as a "previous" access node, while an access node such as router 112 is referred to as a "new" access node or a "target" access node since it is the "target" of the handoff.

As discussed in the background section above, it has been recognized in the prior art that it is advantageous to have a discovery procedure that dynamically apprises an access node of what the inventors refer to as "candidate" access nodes—namely, neighboring nodes which can be a potential target access node. For example, where the wireless network has an approximately hexagonal cell structure and each cell has a separate base station and access router, there can be approximately six candidate access routers for the mobile hosts in a cell. Where the base stations are arranged to form an ad hoc network, the number of candidate access nodes can be completely arbitrary. Accordingly, each access router can utilize the discovery procedure to generate what is referred to herein as a candidate access node/router table, which contains information about its candidate access routers. The table merely acts as a container for this information, which can exist in the memory of the access router itself or in any form of storage media attached to the access router. As long as the access router can access the table, the storage media can be remote and connected via any arbitrary communication medium.

Figure 2:
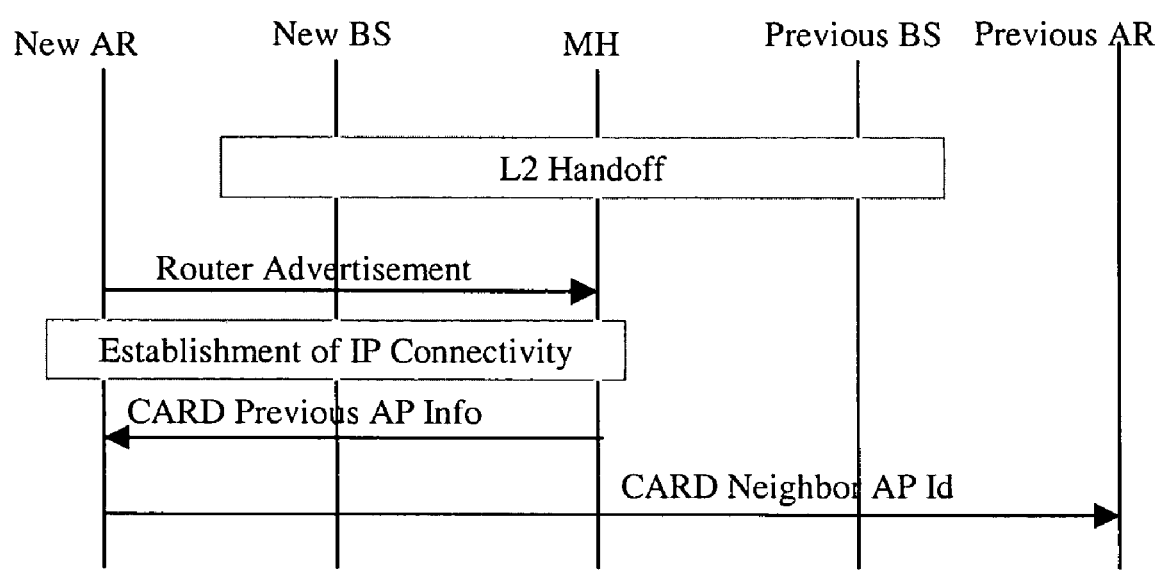
FIG. 2 is a message flow diagram illustrating a candidate access node discovery procedure without security measures.
Figure 3:
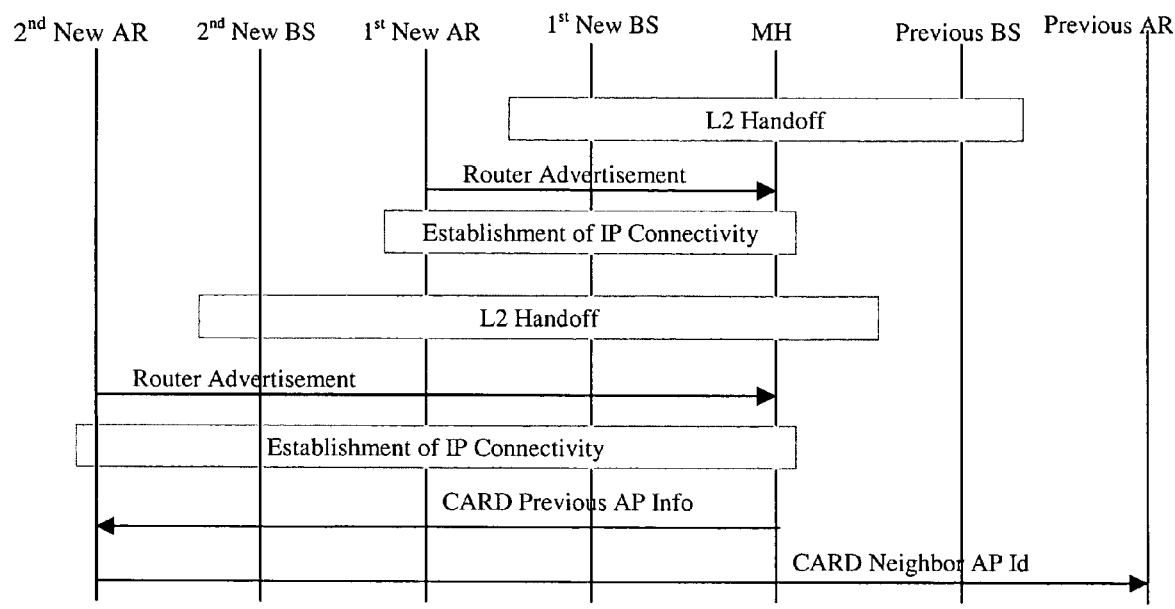
FIG. 3 is a message flow diagram illustrating a delay attack on a candidate access node discovery system.
Figure 4:
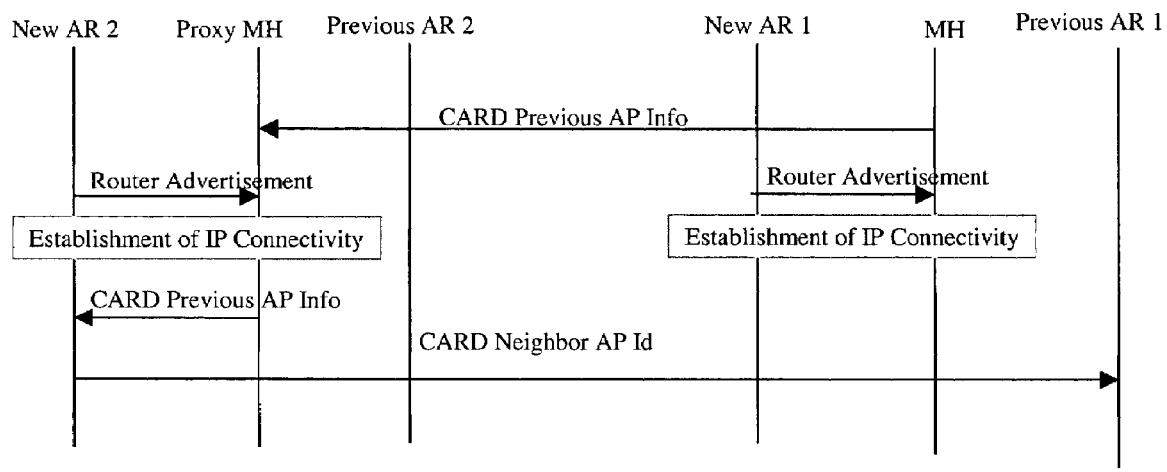
FIG. 4 is a message flow diagram illustrating a third party attack on a candidate access node discovery system.

An example of an insecure prior art candidate access node discovery mechanism is shown in FIG. 2. In FIG. 2 a mobile host is attached to the previous access router and determines the IP address and the link layer address (and any other information necessary to identify the air link) of the access router from the attachment process. After the mobile host hands over from the previous access router to the new access router, the mobile host sends a message containing the previous access router's IP address and layer two identifier to the new access router. The new access router is thereby introduced to the IP address of the previous access router and proceeds to send a message to the previous access router containing the IP address of the new access router. Both access routers thereby know the IP address of the other, and the discovery procedure is thereby completed. Such a discovery mechanism as the one shown in FIG. 2, however, proves susceptible to a range of security threats. For example, if a mobile host is possessed by a malicious attacker, it can be used to provide a false IP address for the previous access router to the new access router. The false information can disrupt the operation of the mobile communication network. One possible attack on the candidate access node discovery system by a malicious mobile host is referred to by the inventors as a "delayed delivery" attack. This scenario is depicted in FIG. 3. In the delayed delivery attack, a malicious mobile host delivers the IP address of the previous access router to the new access router after multiple handoffs rather than a single handoff, resulting in incorrect information populating the candidate access node table. Another possible attack on the candidate access node discovery system is referred to by the inventors as a "third party delivery attack." This scenario is depicted in FIG. 4. In the third party delivery attack, a malicious mobile host sends the information of the IP address of a previous access router to another malicious mobile host that is located in a distant location and attached to an access router that is not a candidate access router. When the remotely-located malicious mobile host delivers this IP address to its new access router, this results again in incorrect information populating the candidate access node table. Merely checking whether the delivered IP address is an IP address of a real access router proves insufficient to defend against such attacks, since these attacks do manage to deliver IP addresses of real access routers. It is also insufficient to merely check whether the mobile host that delivered the IP address was actually attached with the access router with the identified IP address, since this does not defend against the delayed delivery attack. Merely checking the IP address of the delivering mobile host is insufficient to defend against the third party delivery attack, since mobile hosts can change their IP address easily and quickly. It should be noted that although in many networks it may be possible to keep the access routers secure and protected from unauthorized access, it is still often prohibitively difficult to manage the security of the mobile terminals, especially where there are a large number of mobile terminals.

Accordingly, it is advantageous to provide additional security mechanisms to protect the integrity of the discovery procedure. The particular security mechanisms utilized depends on the nature of the candidate access node table utilized. In a first embodiment, it is assumed that the candidate access node information is "shared" between all mobile terminals. In other words, an access router does not distinguish discovered candidate access nodes by which mobile terminal was involved in the discovery procedure. The access node makes the information of all the candidate access nodes in the common candidate access node table available for all of the mobile hosts as requested. In a second embodiment, the inventors have devised a scalable architecture for what they refer to as a "separate" candidate access table mode. A separate candidate access table is, in effect, associated with each mobile terminal, such that an access node can distinguish discovered candidate access nodes by which mobile terminal was involved in the discovery procedure. Separate candidate access tables advantageously can be utilized even when an access node cannot trust their potential candidate access nodes or when they cannot verify the physical identity of the mobile terminal involved in the discovery procedure, as further described in more detail herein.

Figure 5:
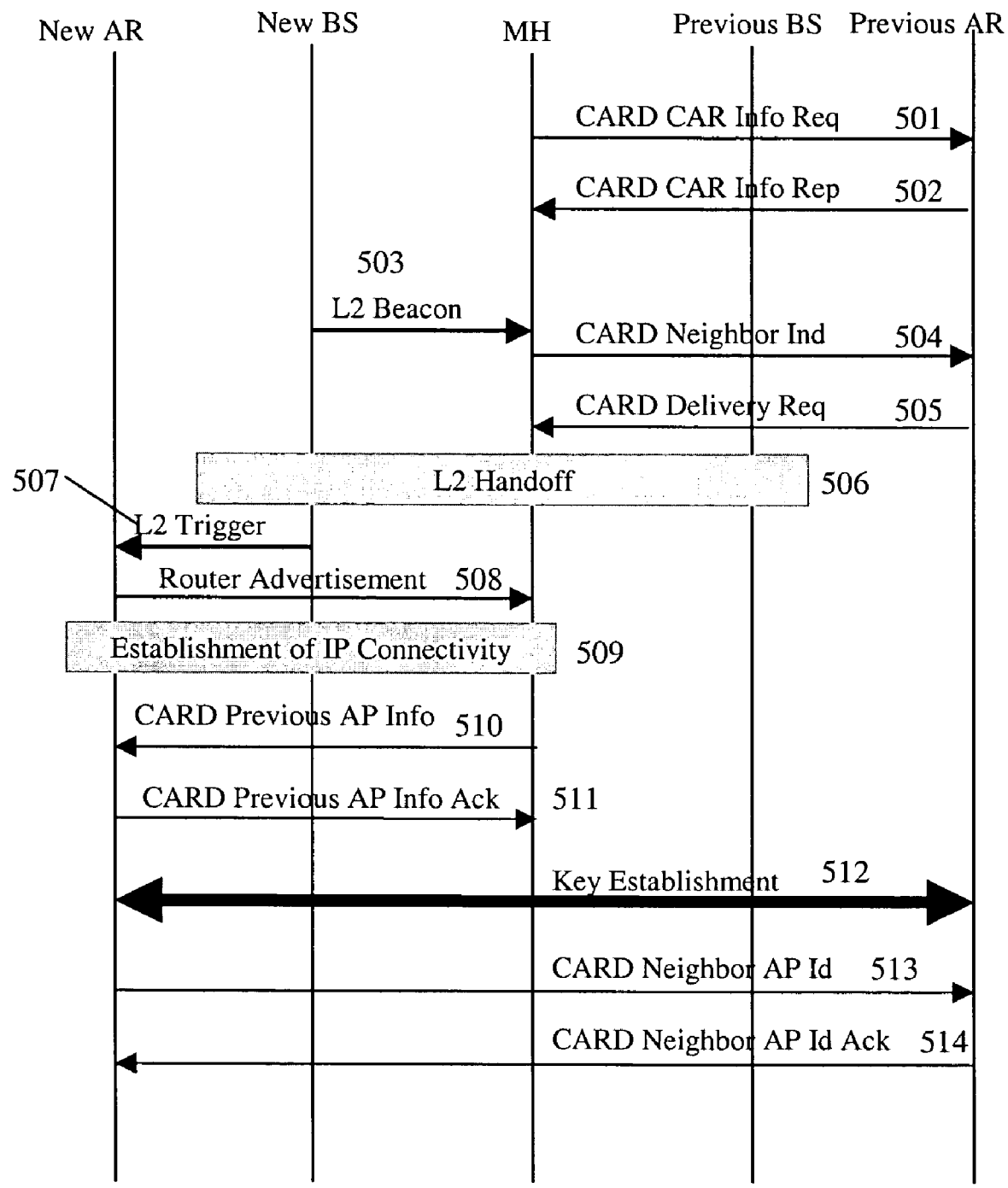
FIG. 5 is a message flow diagram illustrating a secure candidate access node discovery procedure utilizing a common candidate access node table, in accordance with a preferred embodiment of an aspect of the present invention.

Shared Candidate Access Node Table. FIG. 5 is a message flow diagram illustrating the enhanced security mechanisms in a candidate access node discovery procedure with a shared candidate access node table, in accordance with a preferred embodiment of this aspect of the present invention.

At 501, the mobile host (MH) requests candidate access router information from the access router (AR) with which the mobile host is currently communicating. This message, sent by the mobile host to the previous access router in FIG. 5, is denoted a "CARD CAR Info Req" message. The previous access router, at 502, sends the mobile host a "CARD CAR Info Rep" message containing available candidate access router information. FIGS. 6A and 6B shows illustrative message formats for these two messages, respectively.

As the mobile host changes its geographic location, it receives a beacon from a new base station (BS) that is not known to the mobile host or the previous access router, at 503 in FIG. 5. The beacon typically includes the media access control (MAC) address of the new base station. When the mobile host is about to hand over from the previous base station to the new base station, it can send a neighbor indication message, denoted "CARD Neighbor Ind" message, to the previous access router, as shown in 504 in FIG. 5. The neighbor indication message advantageously can contain the MAC address of the new base station along with information such as the air link type and other link specific information. FIG. 6C shows an illustrative message format for the neighbor indication message. The previous access router receives the message and proceeds to create an access router entry in its candidate access router table and fill the entry with the information provided the neighbor indication message from the mobile host. The entry is typically not fully filled in yet since the IP address of the new access router will not yet be known. The previous router then, at 505, sends a delivery request message, denoted "Delivery Req" in FIG. 5, to the mobile host. The delivery request message can contain what the inventors refer to as a "ticket", as shown in the illustrative message format in FIG. 6D. The format and even the content of the ticket can be arbitrary and specific to the access router generating the ticket. For example, and without limitation, the information in the ticket can be no more than an index to a record maintained by the previous access router. The information in the ticket can be more elaborate, such as the timestamp of when the ticket was generated and identification information regarding the mobile host, such as the IP address and/or the physical ID of the mobile host. The information included in the ticket, advantageously, can be transparent to the mobile host and even the new access router if desired for additional security. The mobile host and the new access router can treat the contents of the ticket as an opaque byte string. The previous access router can later authenticate the ticket and determine when it was issued to the mobile host and, preferably, the IP address and physical ID of the mobile host for which the ticket was issued.

In FIG. 5, at 506, after receiving the delivery request message, the mobile host proceeds to perform the planned layer two handoff from the previous base station to the new base station. After the layer two handoff, at 507, the new base station informs the new access router of the arrival of the mobile host by a layer two trigger message. The layer two trigger message can contain the MAC address of the mobile host. The new access router records the time when it received the layer two trigger message. After the mobile host completes the layer two handoff, it can receive a router advertisement message from the new access router, at 508, as the new access router broadcasts its router advertisement message periodically. Once the mobile host receives the router advertisement message from the new access router, the mobile host performs the procedure for establishing IP connectivity with the new access router at 509. For example, and without limitation, the mobile host can utilize the Mobile IP registration procedure, where Mobile IP is support is provided. See Section 3 "Registration" in C. Perkins, ed., "IP Mobility Support," RFC 2002, as referenced above.

At 510, the mobile host provides the ticket and other useful information about the previous attachment point to the new access router, in what is denoted a "CARD Prev AP Info" message. The message can include, for example and without limitation, the previous access router's IP address, the previous access router's layer two identifier, etc. An illustrative message format is shown in FIG. 6E. The new access router then, at 511, sends an acknowledgement in the form of a "CARD Prev AP Info Ack" message to the mobile host. An illustrative message format is shown in FIG. 6F. Since the new access router presumably does not have an entry for the previous access router in its candidate access router table, the new access router can also create a new entry for the previous access router in its candidate acces router table, filling the entry with information received in the "CARD Prev AP Info" message.

The new access router and the previous access router then proceed to communicate with one another in order to verify the information provided by the mobile host before updating the respective candidate access router tables. It is preferable that the access routers authenticate messages exchanged between the two routers in order to prevent a possible "man-in-the-middle" attack, where a malicious entity between the access routers intercepts the message and changes the IP address specified in the message. Accordingly, the new access router and previous access router preferably can perform some authentication process, such as a key establishment procedure to generate keys to be used for authentication of messages exchanged between the two routers at 512. The particular details of such an authentication procedure are not important to the present invention; any advantageous secure authentication process should work with the instant discovery procedure. For example, and without limitation, authentication can be based on well-known Diffie-Hellman implementations. See, e.g., Diffie & Hellman, "New Directions in Cryptography", IEEE Transactions on Information Theory IT-22, November 1976. After establishing a key for message authentication, the new access router sends a neighbor identification message to the previous access router, denoted a "CARD Neighbor ID" message at 513 in FIG. 5. The message can preferably contain the above-mentioned ticket issued by the previous access router, information identifying the mobile host that delivered the ticket and/or the time period that has passed since the mobile host connected to the new base station and/or access router (otherwise referred to herein as the "stay time"). The new access router can also include the new access router's certificate in the message, as depicted in the illustrative message format shown in FIG. 6G.

After receiving the neighbor identification message from the new access router, the previous access router authenticates the whole message and, then, proceeds to verify the information in the message. For example, and without limitation, the previous access router can apply any one or all of the following verification checks:

a) The previous access router can verify the new access router's certificate contained in the message.

b) The previous access router can verify that it was the router that issued the ticket contained in the message by authenticating the ticket.

c) The previous access router can check the identity of the mobile host by comparing the mobile host identification information provided by the new access router with identification information previously recorded by the previous access router or with identification information encoded in the ticket by the previous access router.

d) The access router can check for a possible delayed delivery attack by determining the age of the ticket and whether the ticket is too "old." For example, the ticket can be judged expired in the following case:

$$T_{current} - T_{ticket} - T_{staytime} > T_{threshold}$$

where $T_{current}$ is the current system time, $T_{ticket}$ is the system time when the ticket was generated or delivered, and $T_{staytime}$ is the mobile host's "stay time" contained in the above-mentioned neighbor identification message. The left hand of the equation above is a rough approximation of the time taken for the layer two handoff for the mobile host between the previous base station and the new base station. Since the time required for a layer two handoff can vary, different threshold values, $T_{threshold}$, can be applied for different link technology combinations.

If the information in the message from the new access router passes the verification checks, the previous access router can acknowledge that the new access router is a candidate access router and fill the entry of its candidate access router table with the new access router's IP address. Otherwise, the entry can be deleted. Likewise, newly-generated entries that have not been confirmed within a certain predetermined time period can also be deleted. The previous access router can then, as depicted in 514 in FIG. 5, send an acknowledgment message, denoted a "CARD Neighbor Ack" message, to the new access router. A result field can be included in the message that indicates, e.g., by encoding a "yes" or "no" answer, whether the new access router was acknowledged as a candidate access router by the previous access router. The message can also include the access router certificate of the previous access router. After verifying the certificate of the previous access router, the new access router can then optionally confirm the previous access router as one its candidate access routers, assuming the message includes a "yes" answer. An illustrative message format is shown in FIG. 6H.

It is advantageous for an access router to allow only a limited number of neighbor identification messages from the same router within a certain time period. This prevents a malicious node from sending a large number of messages to inflict a denial of service attack on an access node. Similarly, an access router should preferably permit only one candidate access node message from a mobile terminal during its attachment and simply ignore any subsequent similar messages. This prevents a malicious mobile terminal from sending lots of candidate access node messages to the current access node and thereby causing the access node to spend too much time communicating with other access nodes.

It should be noted that the procedures specified in FIG. 5 represent a preferred embodiment and that one skilled in the art would readily appreciate and devise variations that embody the principles of these aspects of the present invention. For example, and without limitation, the current/new access router can take responsibility for verification of the relevant information (such as the physical identity of the mobile terminal to prevent the third party delivery attack, or of the timestamp to prevent the delayed delivery attack) rather than the previous access router, and can inform the previous access router when the information has been verified.

Separate Candidate Access Node Table. In accordance with an embodiment of another aspect of the invention, and as mentioned above, a separate candidate access router table can effectively be established for each mobile host. That is, information about a particular candidate access router is used only for the mobile hosts that independently helped discovery of the candidate access router. Thus, if a malicious mobile host provides false information, it does not affect other mobile hosts because the false information is not going to be used for other mobile hosts. So there is no motivation for a mobile host to provide false information. Based on such a scenario, each access router can consider information delivery by mobile hosts as reliable in a separate candidate access router table mode. Reliable candidate access router discovery becomes possible even if two candidate access routers cannot trust each other.

A problem with the separate candidate access router table scenario is how to manage a large number of separate tables when the number of mobile hosts is large. If each table separately associated with each mobile host takes around 100 bytes and there are 100,000 mobile hosts, the candidate access router tables can take 10 Mbytes of memory, which is a significant overhead. The overhead gets larger as the average size of the table increases and the number of mobile hosts increases. So, a mechanism is needed to manage the separate tables in a scalable manner. One solution is to use a central server providing a large memory or storage space where such tables are stored. Another solution is to attach a large storage device to each access router and storing the tables in the storage device. In accordance with a preferred embodiment of this aspect of the invention, another solution is to establish a common candidate access router table and have each mobile host possess information on which entries in the common table are available for the particular mobile host. The inventors refer to the embodiment of such information herein as a "Class ID card." The Class ID card and its associations with the common candidate access router table can be represented in a number of different ways. For example, and without limitation, the Class ID card can contain a bitmap, where each bit of the bitmap corresponds to an access router entry in the candidate access router table, as depicted abstractly in FIG. 10. The Class ID card can also include additional information, such as the IP address of the mobile host and a timestamp. The Class ID card can be issued by an access router to the mobile host and, preferably, can be digitally signed by the issuing access router. The Class ID card advantageously can be seen as merely an opaque byte string to the mobile host. The exact format of the Class ID card and/or how it is signed can be specific to each access router and is not important for purposes of the present invention.

Figure 7:
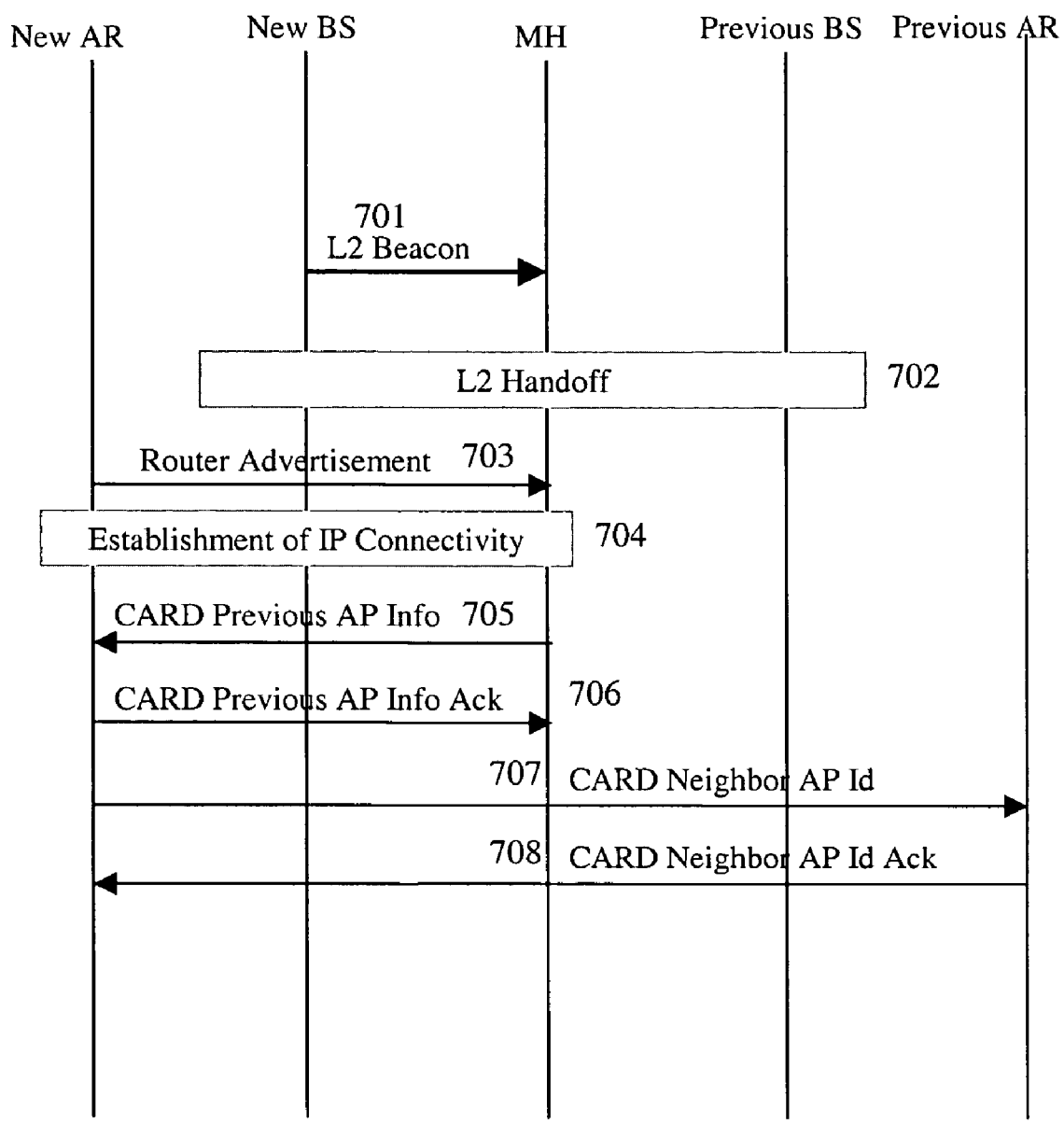
FIG. 7 is a message flow diagram illustrating a secure candidate access node discovery procedure utilizing separate candidate access node tables, in accordance with a preferred embodiment of another aspect of the present invention.

FIG. 7 is a message flow diagram illustrating the candidate access node discovery procedure using separate tables, in accordance with a preferred embodiment of this aspect of the present invention. Herein, as above, the access nodes shall be referred to, without limitation, as access routers and the mobile terminal as a mobile host. Where the messages serve similar purposes to those described above, they are given similar names in FIG. 7.

The mobile host and the previous access router preferably establish a secure communication channel, e.g., by establishing keys for secure message exchange using a procedure such as Diffie-Hellman authentication. The mobile host requests the candidate access router information from the access router to which the mobile host is communicating. The mobile host sends a "CARD CAR Info Req" message to the previous access router, where the message preferably contains a Class ID card for the mobile host. The Class ID card was presumably previously issued to the mobile host by another access router; or if the mobile host does not have a Class ID card issued by another access router, a null class ID card can be used. The previous access router preferably authenticates the Class ID card and verifies its validity, e.g., by checking the timestamp on the Class ID card. Then, the previous access router selects the entries in its candidate access router table indicated in the bitmaps of the Class ID card and composes a "CARD CAR Info Rep" message containing the available candidate access router information. The previous access router then sends the "CARD CAR Info Rep" message to the mobile host. If the Class ID card is null, the "CARD CAR Info Rep" message would contain no candidate access router information.

At 701 in FIG. 7, the mobile host receives a beacon from the new base station (New BS) that is not known to the mobile host or the previous access router. The beacon can contain the MAC address or some other identifier fro the new base station. After handoff at 702, and the establishment of IP connectivity with the new access router (New AR) at 704, the mobile host sends a "CARD Previous AP Info" message to the new access router at 705. An illustrative message format is shown in FIG. 8A. There is no requirement to maintain any measurements of the timing of the procedure, e.g. between the "CARD Delivery Req" message and the "CARD Previous AP Info" message. This is because the previous access router does not need to check how long it takes to receive the message since the previous access router issued the original information to the mobile host. Unlike the embodiment described above for the common candidate access node mode, there is no need to keep track of information such as the layer two trigger. The new access router at 706 sends a "CARD Previous AP Info Ack" message to the mobile host. An illustrative message format is shown in FIG. 8B. The mobile host updates its Class ID card with the Class ID card in the "CARD Previous AP Info Ack" message, unless it is a null Class ID card as mentioned above.

After receiving the "CARD Previous AP Info" message from the mobile host, the new access router can send a "CARD Neighbor Id" message to the previous access router at 707. There is no need to include the fields regarding the mobile host's physical identification or the "stay time", as specified above for the common candidate access node mode. The message and its acknowledgement can have an illustrative format shown in FIGS. 8C and 8D.

It again should be noted that the procedures specified in FIG. 7 represent a preferred embodiment and that one skilled in the art would readily appreciate and devise variations that embody the principles of these aspects of the present invention. For example, and without limitation, the previous access router can be responsible for generating the equivalent to the Class ID card and can forward the new information to the new/current access router, which then forwards the new information to the mobile terminal. The Class ID card can be represented in a multitude of different formats and can include additional information as necessary and appropriate.

Contents of the Candidate Access Node Table. An access node, as described above, may be deployed so as to serve a number of different base stations. Each base station would correspond to a wireless link, and each wireless link may have a number of different attributes, for example, and without limitation, the type of link, the total bandwidth, the operating frequency, the price charged for usage, etc. Each attribute can potentially have a value of a different length. Also, there may be attributes of an access node that apply to all of its base stations or wireless links; there may be an attribute that can have a limited lifetime or that can be permanently-configured.

Accordingly, it may be advantageous to present the information of a candidate access node table using a TOLV (type, option, length, value) field, in particular when the information is reflected in a message such as a "CARD CAR Info Rep" message. Each attribute can be assigned a type number and each field can consist of an attribute's type number, value length in bytes and the value as a byte string. Whether the value is an integer or a character string or any other format can be defined for each attribute, but the format need not be presented in the message. The value format definitions of attributes can be distributed using other means such as publication. It is advantageous to define two categories of attributes: object identity attribute and object characteristics attribute. More object identities can be defined as necessary. A plurality of characteristics attributes can belong to an access node. Such relationships can be represented by putting an access node identity field, followed by the characteristics of the attributes. When an access router identity attribute precedes a plurality of base station identity attributes, this can represent that the base stations are served by the particular access router. Whether the value of an attribute has a lifetime or is permanent can be presented in option bits. If the option bits indicate that the value has a lifetime, the first few bytes of the value can represent a lifetime in some time period such as seconds.

Figure 10:
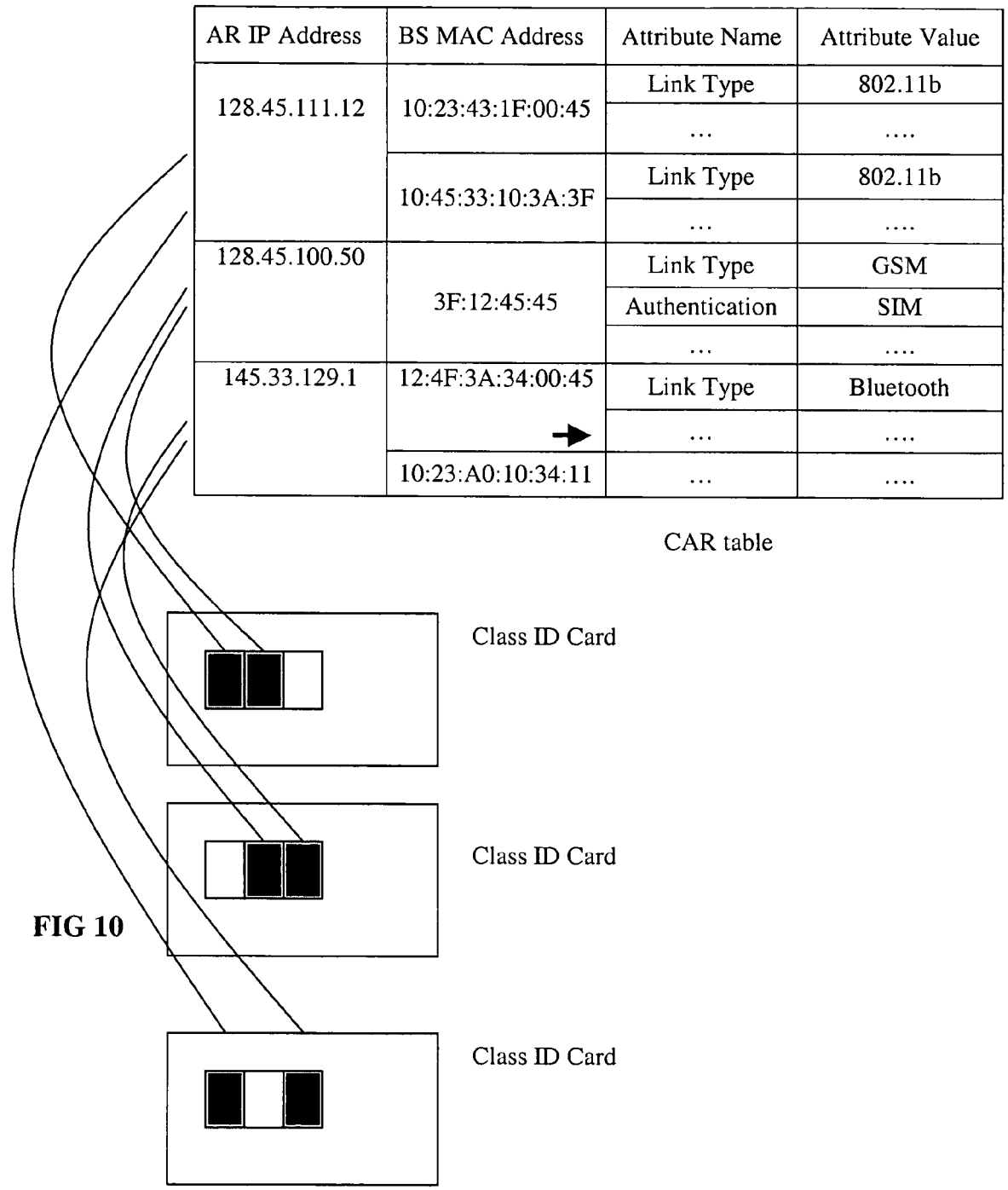
FIG. 10 are illustrations of various Class ID cards in the form of bitmaps along with a corresponding candidate access node table, in accordance with a preferred embodiment of another aspect of the present invention.

FIG. 9 shows an illustrative candidate access node table that reflects various attributes that can be possible in a network that supports a multiplicity of different types of wireless links. FIG. 10 shows how the Class ID cards can be represented as bitmaps corresponding to entries in the illustrative candidate access node table.

After a candidate access node is discovered and registered in the candidate access node table, the entry of the candidate access node can be refreshed at every handoff from the candidate access node. That is, a mobile terminal can send a message (such as a "CARD Previous AP Info" message) to the new access router after the handoff, even though the new access router is already known as a candidate access router to the previous access router. In this case, the message does not contain a ticket or such other information. The new access router receiving the message can decide to refresh its candidate access node table if the previous access router is already registered in its table. The new access router does not need to send a message to the previous access router, although it can to further verify the information. A refresh message can be made optional and/or based on some freshness metric reflected in the candidate access node table. For example, every time an entry in the table is updated, a refresh time for the entry can be updated, based on the system time maintained by the access node. An entry in the candidate access node table that has a refresh time that exceeds some defined freshness metric can be invalidated and removed from the table.

It will be appreciated that those skilled in the art will be able to devise numerous arrangements and variations which, although not explicitly shown or described herein, embody the principles of the invention and are within their spirit and scope.

What is claimed is:

1. A method of secure discovery of access nodes in a mobile communication network comprising the steps of:
    providing a mobile terminal with information from a first access node prior to handoff to a second access node;
    after handoff of the mobile terminal to the second access node, providing the second access node with information from the mobile terminal, wherein the information from the mobile terminal comprises information from the first access node;
    receiving at the first access node a message from the second access node requesting verification of the information provided by the mobile terminal to the second access node;
    verifying the information provided by the mobile terminal to the second access node before updating information on candidate access nodes in the mobile communication network; and,
    comparing a delay to a configurable threshold value, wherein the delay comprises a difference between a current system time minus a time at which the first access node provides the information to the mobile terminal minus a stay time.

2. The method of claim 1 wherin the information of candidate access nodes in the mobile communication network is recorded in a candidate access node table that is shared among mobile terminals in the mobile communication network.

3. The method of claim 1 wherein the information from the first access node comprises a network address of the first access node.

4. The method of claim 1 wherein the information provided by the mobile terminal to the second access node comprises a ticket generated by the first access node for the mobile terminal.

5. The method of claim 1 wherein timestamps recorded by the first access node and the second access node are utilized to measure the delay.

6. The method of claim 1 wherein the information provided by the mobile terminal to the second access node comprises an identifier for the mobile terminal and wherein the information is further verified by checking whether the mobile terminal that provided the information to the second access node is the same mobile terminal that communicated with the first access node prior to handoff.

7. The method of claim 1 wherein the message from the second access node is authenticated.

8. The method of claim 1 wherein a limit is placed on a number of messages received by the second access node from the mobile terminal prior to verifying the information provided by the mobile terminal to the second access node.

9. The method of claim 1 wherein the mobile terminals are Internet Protocol (IP) devices and wherein the access nodes are IP routers.

10. The method of claim 1 wherein the message from the second access node comprises a physical (MAC) address of the first acces node.

11. An access node comprising memory for storing information on candidate access nodes in a mobile communication network and a processor that executes device-readable instructions for performing the steps of:
  providing a mobile terminal with information from the access node prior to handoff to a second access node;
  after handoff of the mobile terminal to the second access node, receiving a message from the second access node requesting verification of information provided by the mobile terminal to the second access node, wherein the information provided by the mobile terminal to the second access node comprises information from the access node; and,
  verifying the information provided by the mobile terminal to the second access node before updating information on candidate access nodes in the mobile communication network; and,
  comparing a delay to a configurable threshold value, wherein the delay comprises a difference between a current system time minus a time at which the first access node provides the information to the mobile terminal minus a stay time.

12. The access node of claim 11 wherein the information provived by the mobile terminal to the second access node comprises a ticket generated by the access node for the mobile terminal.

13. The access node of claim 12 wherein the information provided by the mobile terminal to the second access node comprises an identifier for the mobile terminal and wherein the information is further verified by checking whether the mobile terminal that provided the information to the second access node is the same mobile terminal that communicated with the access node prior to handoff.

14. The access node of claim 12 wherein the message from the second access node is authenticated.

15. The access node of claim 12 wherein the access node further comprises an Internet Protocol (IP) routing circuit.

16. The method of claim 12 wherein the message from the second access node comprises a physical (MAC) address of the first access node.

17. A mobile terminal comprising memory and a handoff processing circuit that performs the steps of:
  prior to handoff to a second access node, receiving information from a first access node and a ticket generated by the first access node;
  storing the ticket and the information from the first access node in the memory;
  after handoff to a second access node, providing the ticket and the information from the first access node to the second access node, so that the second access node can verify the ticket with the first access node prior to updating information on candidate access nodes in a mobile communication network;
  wherein the ticket is utilized by the first and second access nodes to compare a delay to a configurable threshold value, wherein the delay comprises the difference of a current system time minus a time at which the ticket was generated minus a stay time.

18. The mobile terminal of claim 17 wherein the ticket comprises an identifier for the mobile terminal and wherein the ticket is further verified by checking whether the mobile terminal that provided the information to the second access node is the same mobile terminal that communicated with the first access node prior to handoff.

19. The method of claim 1 wherein the message from the second access node comprises a physical (MAC) address of the first access node.

* * * * *